(12) United States Patent
Lucas et al.

(10) Patent No.: US 8,779,709 B2
(45) Date of Patent: Jul. 15, 2014

(54) APPARATUS FOR CONTINUED OPERATION OF AN ELECTRIC MOTOR DURING AN INTERRUPTION IN INPUT POWER

(75) Inventors: Michael O. Lucas, Franksville, WI (US); Rick L. Tennessen, Racine, WI (US); Harry W. Schulz, Mt. Pleasant, WI (US); William S. Hammel, Franksville, WI (US); James J. Sewell, Racine, WI (US)

(73) Assignee: Unico, Inc., Franksville, WI (US)

( * ) Notice: Subject to any disclaimer, the term of this patent is extended or adjusted under 35 U.S.C. 154(b) by 147 days.

(21) Appl. No.: 13/564,811

(22) Filed: Aug. 2, 2012

(65) Prior Publication Data

US 2013/0043813 A1 Feb. 21, 2013

Related U.S. Application Data

(60) Provisional application No. 61/524,531, filed on Aug. 17, 2011.

(51) Int. Cl.
*H02P 27/05* (2006.01)
*H02P 29/02* (2006.01)

(52) U.S. Cl.
CPC ................................ *H02P 29/022* (2013.01)
USPC .................... 318/400.3; 318/400.01; 318/700

(58) Field of Classification Search
CPC ..................................................... H02P 29/022
USPC .................................. 318/400.3, 400.01, 700
See application file for complete search history.

(56) References Cited

U.S. PATENT DOCUMENTS

| | | | |
|---|---|---|---|
| 3,593,103 A | 7/1971 | Chandler | |
| 5,479,081 A | 12/1995 | Seibel et al. | |
| 6,313,600 B1 | 11/2001 | Hammond et al. | |
| 6,686,718 B2 | 2/2004 | Jadric et al. | |
| 7,106,023 B2 * | 9/2006 | Ota et al. | 318/803 |
| 7,330,779 B2 | 2/2008 | Schulz | |
| 7,437,215 B2 | 10/2008 | Anderson et al. | |
| 7,534,096 B2 | 5/2009 | Schulz | |

* cited by examiner

*Primary Examiner* — David Luo
(74) *Attorney, Agent, or Firm* — Reinhart Boerner Van Deuren s.c.

(57) ABSTRACT

An apparatus is provided for controlling operation of an electric motor through use of an additional power storage arrangement connected across the DC busses of a motor drive and controlling the speed of the motor. The additional power storage arrangement includes an additional capacitor arrangement and a rate limiting arrangement in a series circuit relationship with one another.

20 Claims, 8 Drawing Sheets

APPARATUS FOR CONTINUED OPERATION OF AN ELECTRIC MOTOR DURING AN INTERRUPTION IN INPUT POWER

CROSS-REFERENCE TO RELATED PATENT APPLICATIONS

This patent application claims the benefit of U.S. Provisional Patent Application No. 61/524,531, filed Aug. 17, 2011, the disclosure and teachings of which are incorporated herein in their entireties, by reference.

FIELD OF THE INVENTION

This invention generally relates to control and operation of an electric motor, and more particularly to control and operation of an electric motor driving a device that has a tendency to be driven backwards at substantial speed and/or torque under power disturbance conditions.

BACKGROUND OF THE INVENTION

There are many applications in which a driven device in the form of a pump, compressor, etc., is driven at a variable speed by an electric motor connected to a source of line power through a motor drive. Such a motor drive typically includes an input rectifier section and an output inverter section. The input rectifier section receives alternating current power at a constant frequency from the source of line power, and converts the alternating current received into a DC current supplied on a DC bus at the output of the rectifier section. The inverter section has an input connected to the DC bus, and is controlled to provide an alternating current motor drive signal at inverter outputs connected to the electric motor. The frequency and amplitude of the alternating current motor drive signal is adjusted as desired to cause the motor to run at a desired motor speed.

Such motor drive arrangements typically also include a power storage arrangement connected across the bus. The power storage arrangement typically includes a capacitor arrangement, and is configured to be charged and discharged by current flowing into the bus from the input rectifier section and out of the bus to the inverter section during operation of the motor drive in such a manner that the motor drive signal shape is improved. Another function of the power storage arrangement is to hold the voltage across the bus relatively constant during minor interruptions or other perturbations of the power being received from the line source.

For many applications, power storage arrangement can be configured to accommodate even somewhat extended interruptions of power from the line source by simply increasing the amount of capacitance in the power storage arrangement. There are practical limits inherent in this type of a motor drive arrangement, however, on the degree to which the capacitance in the power storage arrangement can be increased.

In applications of motor drives where a driven device exhibits a strong tendency to back drive the motor at high speed and/or torque, for example, the small to moderate capacitance that would typically be included in a power storage arrangement of a motor drive may not be sufficient to keep the driven device rotating in its normal drive direction for the full duration of an interruption to the line power. While it would seem to be logical to merely continue to increase the capacitance in the power storage arrangement to a degree necessary for sustaining continued operation of the motor in driving the driven device throughout the duration of the power interruption, there are a number of practical limitations and disadvantages to taking this approach.

Motor applications that are susceptible to having the motor be driven backwards with substantial speed and/or torque under power disturbance conditions include applications such as submersible pumps, or pumps and compressors supplying pressurized fluid to a storage tank located above the pump, or a pressurized tank or accumulator.

For example, where the motor is driving a submersible centrifugal pump located at the bottom of a wellbore of the type encountered in the oil industry, there may be a mile or more of fluid in a discharge line above the centrifugal pump impeller, between the pump and the surface of the ground above. When power to the centrifugal pump is lost through an interruption of electrical power supplied to the drive motor connected to the impeller, the weight of fluid in the discharge line above the pump impeller will cause the pump impeller to slow down and eventually reverse direction as the fluid in the discharge line is urged by gravitational force to flow backwards through the pump impeller into the wellbore. Where the quantity and weight, or pressure, of the fluid in the discharge line is substantial, this phenomenon can cause the centrifugal pump to be accelerated to a very high speed in the reverse direction. Once the impeller begins to rotate in an opposite direction, and particularly once it has begun to rotate at high speed, it may be impossible for the motor drive to regain control of the motor and return the impeller of the pump to its normal rotational direction following a restoration of input power.

If a submersible pump loses power from the mains long enough for the column of fluid to force the motor to spin in reverse, the pump cannot be restarted until the motor and pump come to rest. It can take a long time for the column of fluid to descend with the resulting loss of production. Compounding the loss of production problem, it can take a long time for the pump to refill the column of fluid after power is restored before actual production resumes. A large capacitor arrangement attached to the inverter's bus could theoretically keep the drive running while the mains are interrupted, but the current inrush when the mains are restored can destroy the rectifier section of many inverters. Inverters with small bus capacitance do not have the inrush problem, but the addition of a large capacitor arrangement would recreate the problem.

In addition to causing undesirably high inrush current, simply increasing the capacitance in the power storage arrangement can have other undesirable consequences. As will be appreciated by those having skill in the art, with relatively low capacitance in the power storage arrangement, there is a lower level of line harmonics. As the capacitance in the power storage arrangement is increased to a high level, however, the diodes in the rectifier section only conduct at the high end of the input voltage, and cause additional amplitude of the line harmonics which are problematic to the utility providing the source of line power. Such harmonics can rise to such a level that the utility would impose a surcharge for dealing with such harmonics. Further, in some cases where power from an electric utility grid is not available, generators, solar power and/or wind power may be used and such devices may be damaged or need to be oversize to deal with the effects of increased harmonics.

Another disadvantage of simply increasing the size of capacitors in the power storage arrangement is that, where the capacitance is relatively small, film capacitors can be utilized in the power storage arrangement. Such film capacitors have demonstrated good service life, even when subjected to significant current ripple resistance. Where a large capacitance is required, however, film capacitors do not provide adequate energy density and must be replaced by other types of capacitors, such as electrolytic capacitors. These capacitor types do not provide some of the desirable inherent characteristics of the film capacitors.

What is needed therefore, is an improved apparatus for operation of an electric motor driving a device that has a tendency to be driven backwards with substantial speed and/or torque under power disturbance conditions.

BRIEF SUMMARY OF THE INVENTION

The invention provides an apparatus and method for controlling the operation of an electric motor driving a device that has a tendency to be driven backwards at substantial speed and/or torque under power disturbance conditions, through use of a second power storage arrangement connected across the DC bus of a motor drive. The second power storage arrangement includes a second capacitor arrangement and a rate limiting arrangement connected in a series circuit relationship with one another. By virtue of such an arrangement, the capacitance of the second capacitor arrangement can be made substantially larger than the capacitance of a first power storage arrangement, without incurring disadvantages of the type discussed above in the background section of this application.

In one form of the invention, an apparatus for controlling an electric motor utilizes a motor drive arrangement including a rectifier section, an inverter section, a first power storage arrangement, and a second power storage arrangement. The electric motor is operatively coupled to line power source and rotates in a normal direction. The rectifier section includes electrical inputs for receiving an input alternating current line signal, from a line source, and is configured to convert the input line signal to direct current delivered at plus and minus DC bus outputs of the rectifier section. The inverter section has inputs connected to the plus and minus DC bus outputs of the rectifier and is configured to provide an alternating current motor drive signal at inverter outputs adapted for connection to the electric motor. The first power storage arrangement is connected across the plus and minus DC bus outputs of the rectifier section, and has a first capacitor arrangement having a first capacitance. The second power storage arrangement is also connected across the plus and minus DC bus outputs of the rectifier section. The second power storage arrangement includes a second capacitor arrangement and a rate limiting arrangement in a series relationship with one another. The capacitance of the second capacitor arrangement is larger than that of the first capacitor arrangement and is configured to provide sufficient power for maintaining the electric motor rotation, in the normal direction, throughout an interruption in line power.

In some forms of the invention, the second power storage arrangement may be mounted externally to the remainder of the motor drive arrangement. In one form of the invention, the capacitance of the first capacitor is 135 µF and the capacitance of the second capacitor is 0.11 F.

In some forms of the invention, the first capacitor arrangement includes a film capacitor. In various forms of the invention, the second capacitor arrangement may include an electrolytic capacitor.

A rate limiting arrangement, according to the invention, may be configured to limit the rate at which the second capacitor arrangement charges from the bus, and be further configured so as to not significantly limit the rate at which the second capacitor arrangement discharges to the bus.

In some forms of the invention, the rate limiting arrangement includes a charging circuit leg, and a discharge circuit leg. The charging circuit leg may have a current limiting resistor arranged in a series circuit relationship with the second capacitor, to thereby limit current through the rate limiting arrangement when the second capacitor arrangement is charging. The discharge circuit leg may have a discharge diode in a parallel circuit relationship with the charging circuit leg.

In some forms of the invention, the rate limiting arrangement includes a charging circuit leg, and a discharge circuit leg. The charging circuit leg may have a current limiting resistor and a charging diode arranged in a series circuit relationship with one another and with the second capacitor, to thereby limit current through the rate limiting arrangement when the second capacitor arrangement is charging. The discharge circuit leg may have a discharge diode in a parallel circuit relationship with the charging circuit leg.

In some forms of the invention, the rate limiting arrangement may include a charging circuit leg having a buck-type current chopper arrangement comprising a switching device, such as an IGBT, and an inductor in a series circuit relationship with one another and with the second capacitor, to thereby limit current through the rate limiting arrangement when the second capacitor arrangement is charging. The discharge circuit leg may have a discharge diode in a parallel circuit relationship with the charging circuit leg including the buck-type current chopper arrangement.

In a motor drive arrangement, according to the invention, a bus voltage is generated across the plus and minus bus connections. The motor drive arrangement may include a controller for controlling the AC motor drive signal to achieve a desired motor speed of a motor operatively connected to receive the AC motor drive signal from the inverter. The controller may further control the AC motor drive signal at least partly as a direct function of the bus voltage, in such a manner that the motor speed is reduced as function of a reduction in bus voltage. In some forms of the invention, the motor speed may be continually reduced as bus voltage drops.

Those having skill in the art will recognize that by reducing motor speed as a function of a reduction in bus voltage during an interruption to line power, the size of components in the second power storage arrangement may be reduced while still providing sufficient power to keep the motor rotating in its normal direction throughout the duration of an interruption in line power. Conversely, the length of time that a given configuration of a second power storage arrangement, according to the invention, will be capable of providing adequate power to the motor to continue rotation in the normal operational direction of the motor will be increased by reducing the speed of the motor during the power interruption condition.

Some forms of the invention may take the form of an apparatus including either or both of the electric motor and an input power source.

Other aspects, objects and advantages of the invention will be apparent from the following detailed description and accompanying drawings describing exemplary embodiments of the invention.

BRIEF DESCRIPTION OF THE DRAWINGS

The accompanying drawings form part of the specification and, together with the written description, serve to explain the principles of the invention. In the drawings:

FIG. 1 illustrates a first exemplary embodiment of the invention in the form of a test rig incorporating the invention.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
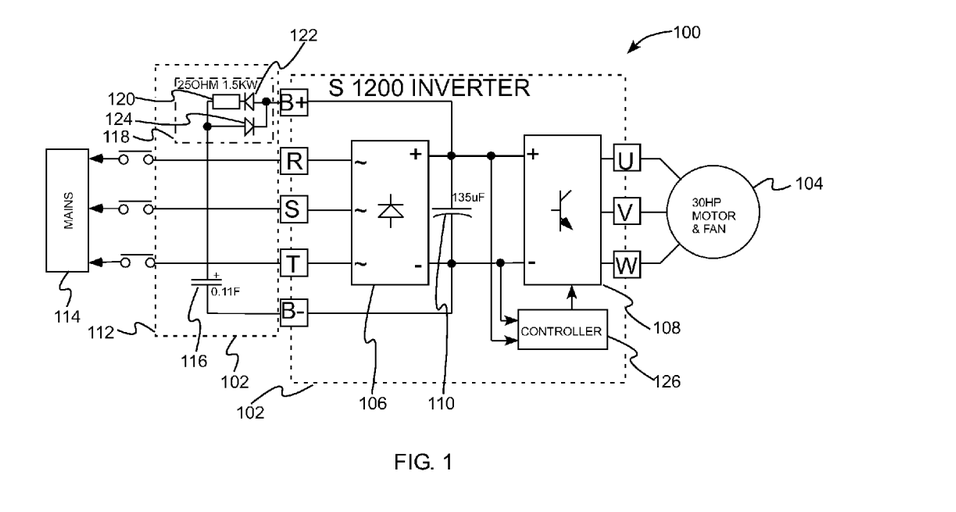
FIG. 1 is a schematic illustration of a first exemplary embodiment of the invention in the form of a motor and motor drive arrangement, including a motor drive having a second power storage arrangement, according to the invention. Specifically.

FIG. 1 shows a first exemplary embodiment of the invention in the form of a motor and drive arrangement 100 including a motor drive 102 operatively connected to an electric motor 104. Specifically, the first exemplary embodiment of the motor and drive arrangement 100 illustrates a physical test rig for the invention, in which the electric motor 104 was driving a fan to provide a speed dependant load on the electric motor 104.

As shown in FIG. 1, the exemplary embodiment of the motor drive 102 includes a rectifier section 106, an inverter section 108, a first power storage arrangement in the form of a first capacitor arrangement 110, and a second power storage arrangement 112.

The rectifier section 106 includes a diode bridge, having electrical inputs R, S, T, for receiving a three-phase alternating current input line signal from a line source 114. The rectifier section 106 converts the input line signals R, S, T to direct current delivered at plus and minus B+, B− DC bus outputs of the rectifier section 106.

The inverter section 108 has inputs connected to the plus and minus bus outputs B+, B− of the rectifier section 106. The inverter section 108 provides alternating current drive signals at inverter outputs U, V, W operatively connected to the electric motor 104.

The first power storage arrangement, in the form of the first capacitor arrangement 110, is connected across the plus and minus bus outputs B+, B− and has a first capacitance. As indicated in FIG. 1, the first capacitance in the exemplary embodiment 100 is 135 μF. It should be understood that the total first capacitance can be provided by more than one capacitor having ratings appropriate for the intended use.

The second power storage arrangement 112 is also operatively connected across the plus and minus bus outputs B+, B−. The second power storage arrangement 112 includes a second capacitor arrangement 116 and a rate limiting arrangement 118 disposed in a series circuit relationship with one another. The capacitance of the second capacitor arrangement 116 is larger than the first capacitance of the first capacitor arrangement 110. Specifically, in the exemplary embodiment shown in FIG. 1, the capacitance of the second capacitor is 0.11 F. It should be understood that the total second capacitance can be provided by more than one capacitor having ratings appropriate for the intended use.

As illustrated in FIG. 1, the second power storage arrangement 112 may be physically located outside of the remainder of the motor drive arrangement 102. Externally locating the second power storage arrangement may be preferable where a large amount of capacitance is required for the second capacitor arrangement 116, in order to allow the remainder of the motor drive to be contained in a smaller volume. Those having skill in the art will recognize, however, that the second power storage arrangement need not be located physically outside of the remainder of the motor drive in practicing the invention.

As further illustrated in the exemplary embodiment of FIG. 1, the rate limiting arrangement 118 in the exemplary embodiment includes a charging circuit leg including a current limiting resistor 120 and a charging diode 122 arranged in a series circuit relationship with one another and also with the second capacitor arrangement 116. The charging diode 122 is oriented to allow current flow through the charging circuit leg and the current limiting resistor 120 to thereby limit the rate at which the second capacitor arrangement 116 can charge when the motor drive 102 is receiving power from the line source 114.

The rate limiting arrangement 118 in the exemplary embodiment of the motor drive 102 shown in FIG. 1 also includes a discharge circuit leg in the form of a discharge diode 124 connected in a parallel circuit relationship with the current limiting resistor 120 and charging diode 122 forming the charging circuit leg. The discharge diode 124 is oriented to bypass the current limiting resistor 120 when the second capacitor arrangement 116 is discharging during periods of operation where the line voltage supplied by the source of line power 114 is absent or has drooped to a level lower than the voltage at which the first and second capacitor arrangements 110, 116 were charged.

In some forms of the invention, a controller 126 may reduce the speed of motor 104 to a predetermined lower value upon detection of a threshold drop in voltage across the bus as measured at the terminals B+ and B−. In other forms of the invention, the controller 126 may reduce the speed of motor 104 as a function of the bus voltage. Such a function may be a proportionality, or any other desired function between the sensed bus voltage and the motor speed. The controller 126 is coupled to the inverter 108 at the input of the inverter section 108 and configured to provide commands to the inverter section 108, for example a reduced motion velocity command.

Operation of the test rig shown in the exemplary embodiment of FIG. 1 will now be described with reference to a series of graphical representations of performance of the exemplary embodiment 100 in various configurations and operational modes.

The component values shown in FIG. 1 were used for a test setup. The 0.11 F second capacitor arrangement 116, in conjunction with 25 ohm resistor 120 and diode 122 limit the current inrush to 26 amps (rated current at full load). The time constant is 2.75 seconds so it takes about 15 seconds to charge the second capacitor arrangement 116. This limits the repetition rate of mains interrupts. The reverse diode 124 allows any amount of current to aid the D.C. bus—during a mains outage.

For analysis and testing, the 3600 RPM 30 HP motor 104 had a truck fan attached to provide a load. Table 1 shows the power used by the fan at various speeds. The power closely follows a cube law vs. RPM.

TABLE 1

| RPM | Motor Power | Motor Volts |
|---|---|---|
| 1800 | 3.5 HP, 2.6 KW | 270 |
| 2700 | 10.6 HP, 7.9 KW | 397 |
| 3600 | 22.0 HP, 16.4 KW | 456 |

Figure 2:
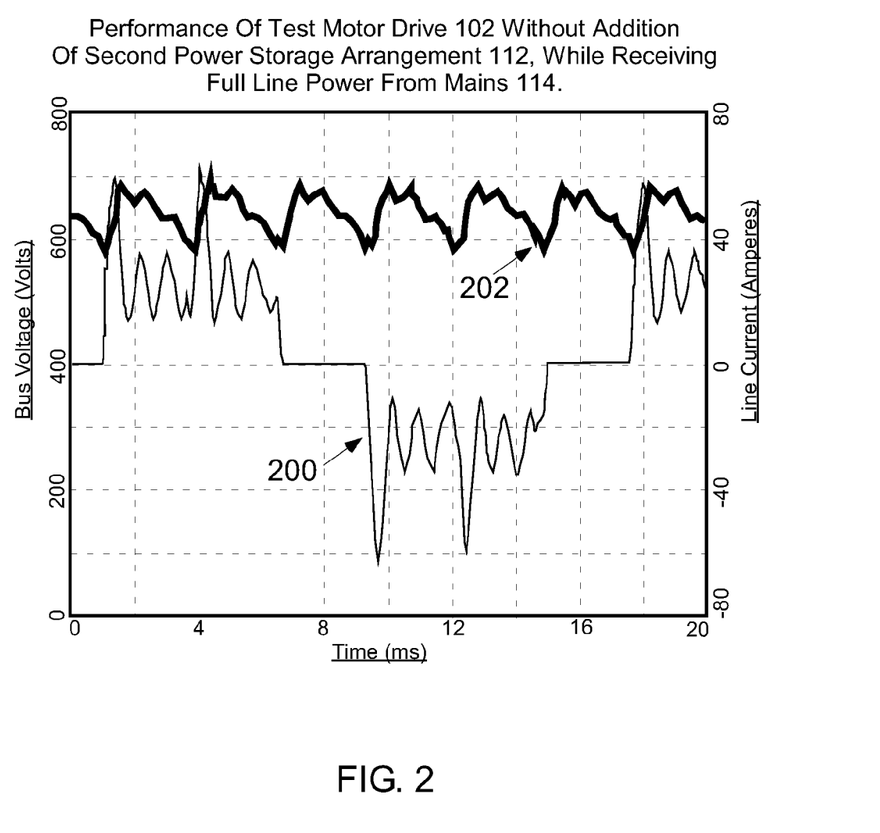
FIG. 2 is a graphical illustration of performance of the exemplary embodiment of FIG. 1 without the addition of the second power storage arrangement, while the test rig is receiving full line power.
Figure 3:
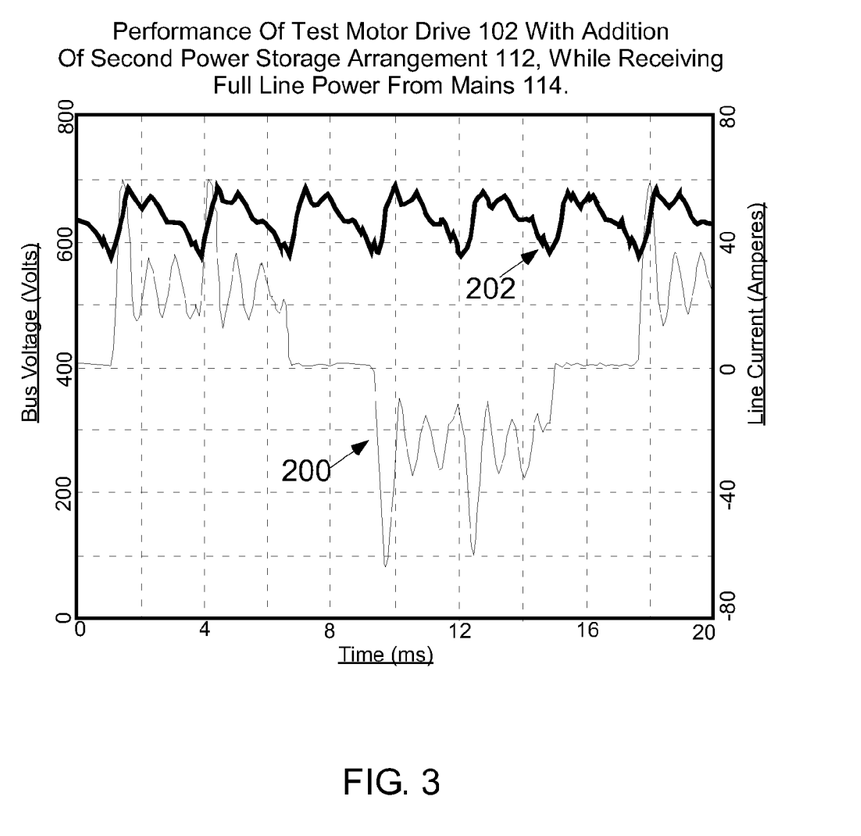
FIG. 3 is a graphical illustration of the performance of the first exemplary embodiment of the invention of FIG. 1, with the addition of the second power storage arrangement, operating while receiving full line power.

The test results for line current 200 and the bus voltage 202 shown in FIGS. 2 and 3, and tabulated in Table 2, demonstrate that when the inverter 108 is running, the diodes 122, 124, resistor 120, and second capacitor arrangement 116 does not significantly change performance of the motor drive 102 or the system from what they were prior to addition of the second power storage arrangement 112.

TABLE 2

| | | Harmonics in Percent | | | | | | | |
|---|---|---|---|---|---|---|---|---|---|
| Amps | THD | $1^{st}$ | $3^{rd}$ | $5^{th}$ | $7^{th}$ | $9^{th}$ | $11^{th}$ | $13^{th}$ | $15^{th}$ |
| S1200 w/o Cap Arrangement | 24 | 47% | 88 | — | 21 | 18 | — | 15 | 12 |
| S1200 with Cap Arrangement | 24 | 42% | 90 | — | 22 | 15 | — | 4.5 | 2.4 |

The harmonics and Total Harmonic Distortion (THD) comparison for the motor drive 102 and system 100 with and without addition of the second power storage arrangement 112 is about the same with the differences being within the measurement error.

Figure 4:
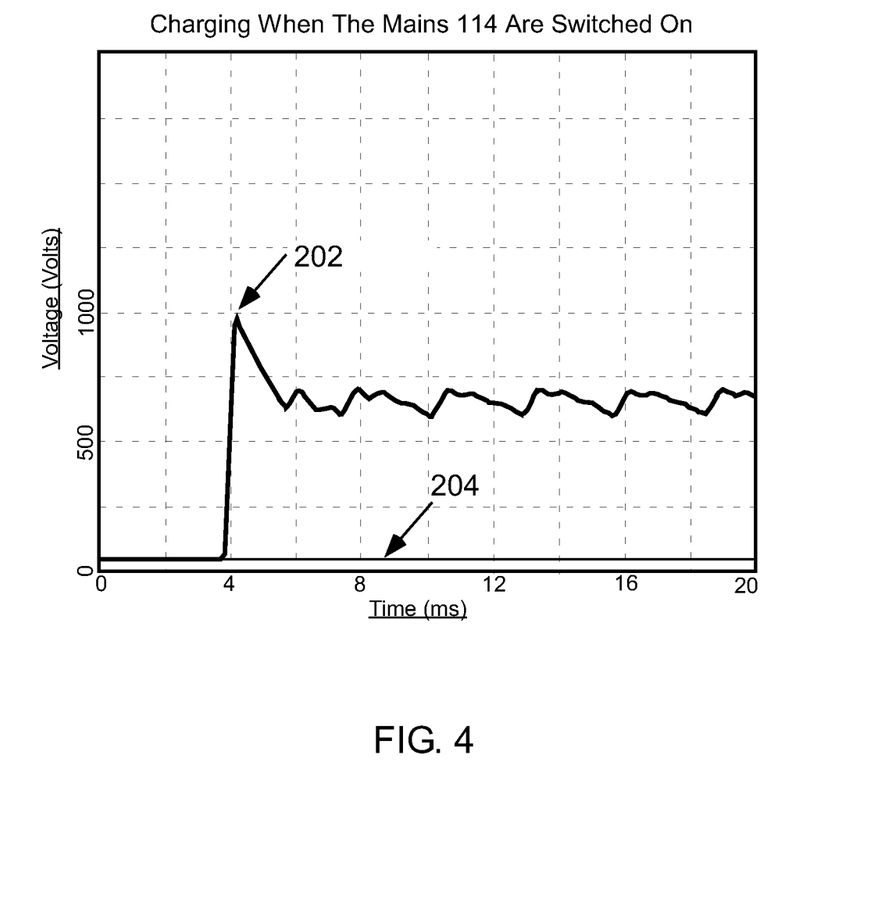
FIG. 4 is a graphical illustration of the charging characteristic of a capacitor arrangement in the second storage arrangement, according to the invention, immediately after the motor drive begins to receive line power as compared with the charging characteristics of the first storage arrangement.

As shown in FIG. 4, if the Thevenin model of the mains 114 has low series impedance, then the first power storage arrangement 110 and the second power storage arrangement 112 will charge as if they have their own separate source. The resistor 120 in the second power storage arrangement 112 has no damping effect on the remainder of the circuit inside the motor drive 102. FIG. 4 shows an overshoot of the bus voltage 202 to 1000 volts when the mains 114 were switched on. In theory it could have been as high as 1300 volts. The charging characteristic of the second capacitor arrangement 116 is shown by the second power storage arrangement voltage 204.

The time scale on the second power storage arrangement voltage 204, in FIG. 4, is too fast to show the exponential charging curve. The 0.11 F capacitor arrangement 116 in the test circuit stores 19.8 KJ and the same amount of energy is dissipated in the 25 ohm resistor 120 during charging. The resistor 120 used for the test is rated 1.5 KW and the initial power when the mains are first engaged is 14.4 KW, so the resistor 120 must dissipate a significant amount of heat. Careful resistor selection is required for a working system. A "buck-type" current chopper comprising a semiconductor switch, such as an IGBT, and an inductor could be substituted for the resistor 120 and diode 122.

Figure 5:
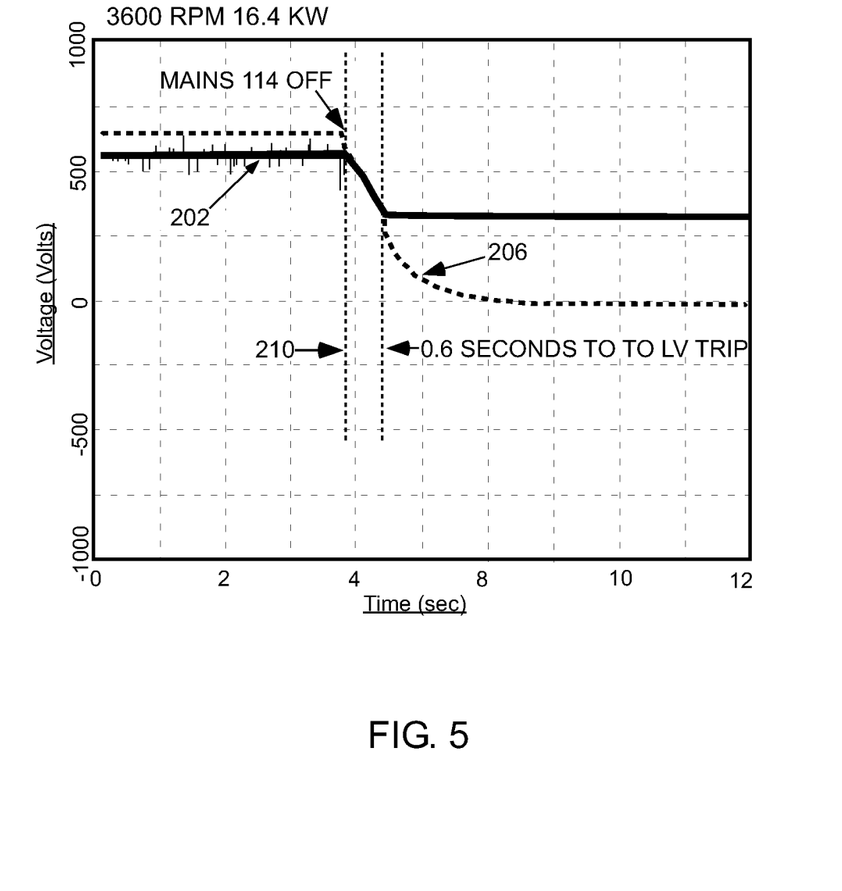
FIGS. 5-7 are graphical illustrations of the performance of the exemplary embodiment of FIG. 1 during a removal of input power, with the motor being commanded to operate at 3600 RPM in FIG. 5, 2700 RPM in FIG. 6 and 1800 RPM in FIG. 7.
Figure 6:
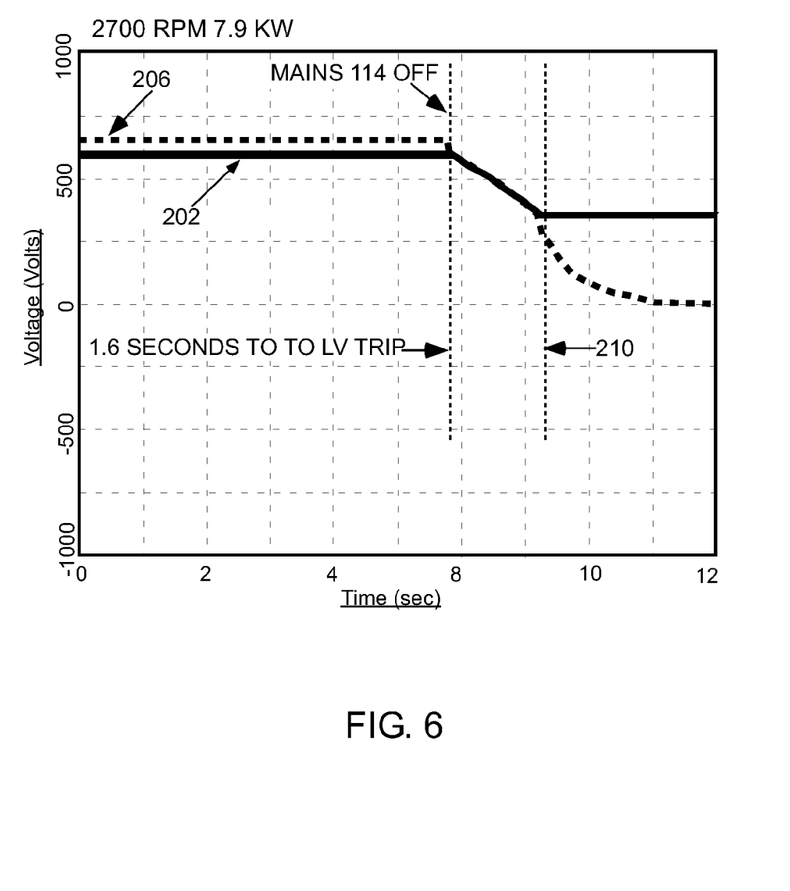
Figure 7:
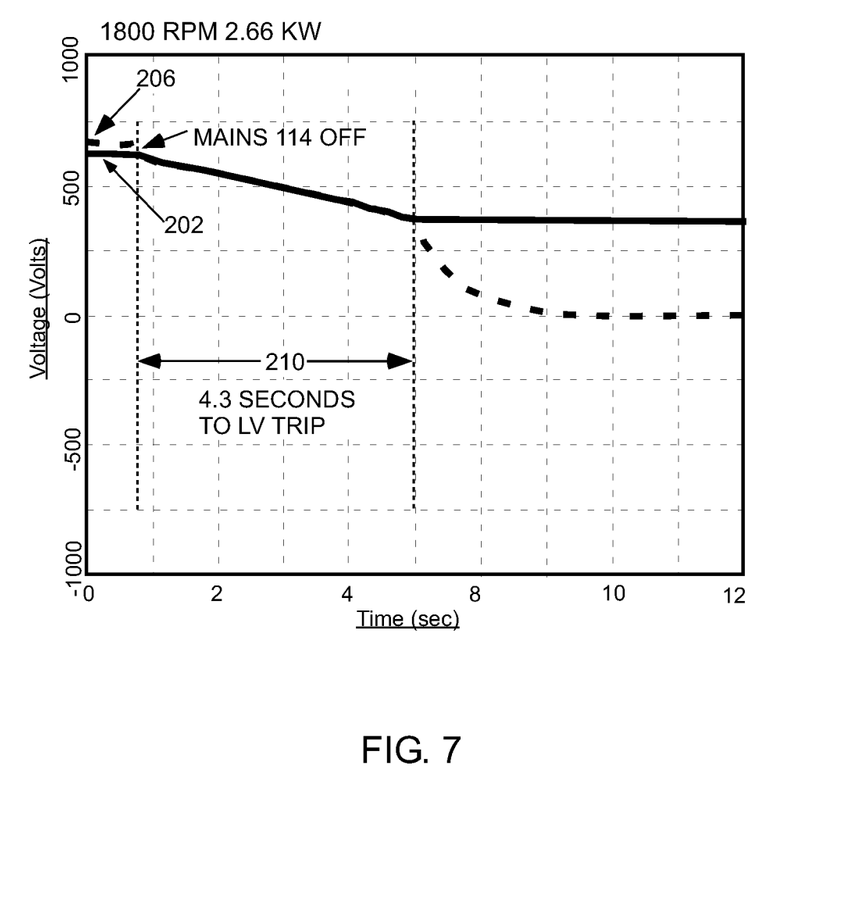

FIGS. 5-7 show the peak motor voltage 206 applied to motor 104 and bus voltage 202 at various motor speeds when the mains 114 are lost. Each of FIGS. 5-7 show that the bus voltage 202 is 600 volts while the motor is running with the mains 114 switched on and that the bus voltage 202 has decreased to 350 volts when the controller 126 shuts off inverter 108 at the low bus voltage threshold. The capacitor arrangement 116 has delivered ½*0.11 F*(600²−350²)=13 KJ during the period 210 after the mains 114 are lost and prior to the controller 126 shutting off the inverter 108.

In the operating scenarios shown in FIGS. 5-7, the motor 104 is still commanded to run at normal operating speed, i.e. 3600 RPM in FIG. 5, 2700 RPM in FIG. 6, and 1800 RPM in FIG. 7 as the bus voltage decays after mains 114 are lost. The supporting peak motor voltage 206 is dropping and the motor current waveform is deteriorating.

FIG. 5 shows the motor drive 102 running 3600 RPM delivering 16.4 KW to motor 104 as the mains 114 open. It takes 0.6 seconds for controller 126 to shut off inverter 108 at the low bus voltage threshold of 350V so a rough energy estimate is 16.4 KW*0.6 seconds=9.8 J. This is similar to the 13 KJ prediction from the stored energy in the capacitor arrangements 110 and 116.

As shown in FIG. 6, when the test is repeated with the motor drive 102 running motor 104 at 2700 RPM while delivering 7.9 KW, it takes 1.6 seconds for controller 126 to shut off inverter 108 at the low bus voltage threshold of 350V (1.6 sec*7.9 KW=12.6 KJ).

As shown in FIG. 7, at 1800 RPM at 2.66 KW, the motor drive 102 runs for 4.2 seconds before controller 126 shuts off inverter 108 at the low bus voltage threshold of 350V (4.2 sec*2.66 KW=11.2 KJ).

As shown in FIG. 5, with the motor drive 102 continuing to command the motor 104 to run at 3600 RPM while the bus is discharging, the current waveforms cannot continue to deliver optimal power during this time and the drive trips within 0.6 seconds. In the operational scenario shown in FIG. 8, a change is made to the commands that controller 126 provides to inverter 108 such that the velocity command to the motor 104 is adjusted proportionally to the bus voltage 202 as the bus voltage 202 is dropping. The gain is set such that when the bus is 600 VDC or greater the velocity command is 3600 RPM. When the mains 114 are turned off, the velocity command diminishes with the bus voltage 202 until the low voltage bus trip is reached.

Figure 8:
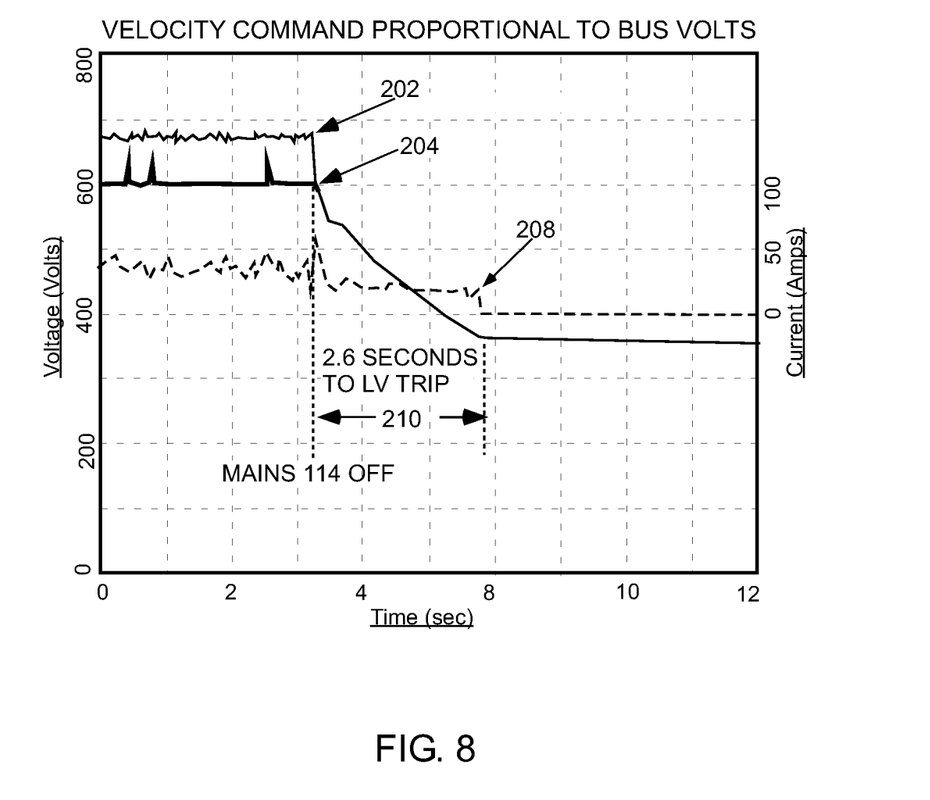
FIG. 8 is a graphical illustration of an operational scenario for the invention, in which the first exemplary embodiment of FIG. 1 is operated to reduce a speed command to the motor as a function of bus voltage during an interruption in line power.

The bus voltage 202 and the second power storage arrangement voltage 204 have their origin at the bottom left corner of FIG. 8. The peak motor armature current 208 is zeroed at the center of FIG. 8.

When the mains 114 are turned off, the drive 102 continues to run for 2.6 seconds before the low voltage trip. This is a factor of 4.3 times longer than the 0.6 seconds when the velocity command was fixed at 3600 RPM, in the operational scenario shown in FIG. 5.

Those having skill in the art will recognize that the values of circuit components in the exemplary embodiment 100 described herein are merely illustrative and not limiting with regard to practice of the invention. In other forms of the invention, component values would likely be different.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for controlling an electric motor through use of a motor drive apparatus, the electric motor operatively coupled to line power and rotating in a normal direction, the apparatus comprising:
    a rectifier section having electrical inputs for receiving an input alternating current line signal from a line source and plus and minus bus outputs for providing a direct current bus signal;
    an inverter section having inputs connected to the plus and minus bus outputs of the rectifier section and providing an alternating current motor drive signal at inverter outputs adapted for connection to the electric motor;
    a first power storage arrangement connected across the plus and minus bus outputs and having a first capacitor arrangement having a first capacitance; and
    a second power storage arrangement connected across the plus and minus bus outputs and having a second capacitor arrangement having a second capacitance and a rate limiting arrangement in a series relationship with the second capacitor arrangement, with the second capacitance larger than the first capacitance and configured to provide sufficient power for maintaining the electric motor rotation, in the normal direction, throughout an interruption of power.

2. The apparatus of claim 1, including the rate limiting arrangement comprising a diode and a resistor configured to limit charging rate of the second capacitor arrangement.

3. The apparatus of claim 2, including the rate limiting arrangement further comprising a second diode configured to allow the voltage of the second capacitor arrangement to provide voltage to the inverter section.

4. The apparatus of claim 3, wherein the first capacitor arrangement comprises a film capacitor and the second capacitor arrangement comprises an electrolytic capacitor.

5. The apparatus of claim 4, further comprising a controller configured to sense a voltage at the inputs of the inverter section and provide a reduced motor velocity command to the inverter section when a reduced voltage is sensed at the inputs of the inverter section when compared to a nominal value of voltage at the inputs of the inverter section.

6. The apparatus of claim 5, wherein the reduced motor velocity command is limited to a maximum value that is calculated by multiplying a normal operating speed of the electric motor connected to the apparatus by the reduced voltage sensed at the inputs of the inverter section and then dividing by the nominal value of voltage at the inputs of the inverter section.

7. The apparatus of claim 3, further comprising a controller configured to sense a voltage at the inputs of the inverter section and provide a reduced motor velocity command to the inverter section when a reduced voltage is sensed at the inputs of the inverter section when compared to a nominal value of voltage at the inputs of the inverter section.

8. The apparatus of claim 7, wherein the reduced motor velocity command is limited to a maximum value that is calculated by multiplying a normal operating speed of the electric motor connected to the apparatus by the reduced voltage sensed at the inputs of the inverter section and then dividing by the nominal value of voltage at the inputs of the inverter section.

9. The apparatus of claim 1, including the rate limiting arrangement comprising a semiconductor switch and an inductor configured to limit charging rate of the second capacitor arrangement.

10. The apparatus of claim 9, including the rate limiting arrangement further comprising a diode configured to allow the voltage of the second capacitor arrangement to provide voltage to the inverter section.

11. The apparatus of claim 10, wherein the first capacitor arrangement comprises a film capacitor and the second capacitor arrangement comprises an electrolytic capacitor.

12. The apparatus of claim 11, further comprising a controller configured to sense a voltage at the inputs of the inverter section and provide a reduced motor velocity command to the inverter section when a reduced voltage is sensed at the inputs of the inverter section when compared to a nominal value of voltage at the inputs of the inverter section.

13. The apparatus of claim 12, wherein the reduced motor velocity command is limited to a maximum value that is calculated by multiplying a normal operating speed of the electric motor connected to the apparatus by the reduced voltage sensed at the inputs of the inverter section and then dividing by the nominal value of voltage at the inputs of the inverter section.

14. The apparatus of claim 10, further comprising a controller configured to sense a voltage at the inputs of the inverter section and provide a reduced motor velocity command to the inverter section when a reduced voltage is sensed at the inputs of the inverter section when compared to a nominal value of voltage at the inputs of the inverter section.

15. The apparatus of claim 14, wherein the reduced motor velocity command is limited to a maximum value that is calculated by multiplying a normal operating speed of the electric motor connected to the apparatus by the reduced voltage sensed at the inputs of the inverter section and then dividing by the nominal value of voltage at the inputs of the inverter section.

16. The apparatus of claim 1, wherein the first capacitor arrangement comprises a film capacitor.

17. The apparatus of claim 1, wherein the second capacitor arrangement comprises an electrolytic capacitor.

18. The apparatus of claim 1, further comprising a controller configured to sense a voltage at the inputs of the inverter section and provide a reduced motor velocity command to the inverter section when a reduced voltage is sensed at the inputs of the inverter section when compared to a nominal value of voltage at the inputs of the inverter section.

19. The apparatus of claim 18, wherein the reduced motor velocity command is limited to a maximum value that is calculated by multiplying a normal operating speed of the electric motor connected to the apparatus by the reduced voltage sensed at the inputs of the inverter section and then dividing by the nominal value of voltage at the inputs of the inverter section.

20. A method for controlling an electric motor with a motor drive apparatus, the electric motor operatively coupled to a line power source and rotating in a normal direction, the method comprising:
- coupling a rectifier section configured for receiving an input alternating current line signal from the line power source for providing a direct current bus signal;
- coupling an inverter section to the plus and minus bus outputs of the rectifier section and providing an alternating current motor drive signal at inverter outputs configured to connect to the electric motor;
- connecting a first power storage arrangement having a first capacitor arrangement including a first capacitance across the plus and minus bus outputs and;
- connecting a second power storage arrangement having a second capacitor arrangement including a second capacitance and a rate limiting arrangement in a series relationship with the second capacitor arrangement across the plus and minus bus outputs, wherein the second capacitance is larger than the first capacitance; and
- coupling a controller to the inverter section and the bus outputs of the rectifier section, the controller configured to sense a voltage at the inputs of the inverter section and provide a reduced motor velocity command to the inverter section when a reduced voltage is sensed at the inputs of the inverter section when compared to a nominal value of voltage at the inputs of the inverter section, with the reduced motor velocity command limited to a maximum value that is calculated by multiplying a normal operating speed of the electric motor connected to the apparatus by the reduced voltage sensed at the inputs of the inverter section and then dividing by the nominal value of voltage at the inputs of the inverter section.

* * * * *